(12) United States Patent
Hurt et al.

(10) Patent No.: US 12,134,175 B2
(45) Date of Patent: Nov. 5, 2024

(54) UNIVERSAL QUICK-CHANGE ADAPTER

(71) Applicants: Daniel Irvin Hurt, Chesterfield, MO (US); Justin Irvin Hurt, Defiance, MO (US)

(72) Inventors: Daniel Irvin Hurt, Chesterfield, MO (US); Justin Irvin Hurt, Defiance, MO (US)

( * ) Notice: Subject to any disclaimer, the term of this patent is extended or adjusted under 35 U.S.C. 154(b) by 380 days.

(21) Appl. No.: 17/455,088

(22) Filed: Nov. 16, 2021

(65) Prior Publication Data

US 2022/0152805 A1 May 19, 2022

Related U.S. Application Data

(60) Provisional application No. 63/115,111, filed on Nov. 18, 2020.

(51) Int. Cl.
*B25D 17/00* (2006.01)
*B25D 17/08* (2006.01)

(52) U.S. Cl.
CPC ........ *B25D 17/005* (2013.01); *B23B 2231/04* (2013.01); *B25D 17/08* (2013.01); *B25D 2217/0015* (2013.01); *B25D 2217/0019* (2013.01)

(58) Field of Classification Search
CPC .............. B25D 17/005; B25D 17/08; B25D 2217/00105; B25D 2217/0019; B25D 2250/291; B23B 2231/04

See application file for complete search history.

(56) References Cited

U.S. PATENT DOCUMENTS

| | | | |
|---|---|---|---|
| 3,349,461 A * | 10/1967 | Niedzwiecki .......... | B25D 17/02 29/81.14 |
| 4,903,784 A | 2/1990 | Glaser | |
| 5,251,367 A * | 10/1993 | Ward .................... | B25D 17/02 173/168 |
| 2014/0262399 A1 | 9/2014 | Cunningham | |
| 2016/0215577 A1 | 7/2016 | Bye | |
| 2018/0222032 A1* | 8/2018 | Cheng ................. | B25D 17/043 |
| 2020/0254596 A1* | 8/2020 | Sawa ................. | B23B 31/1071 |
| 2021/0086339 A1* | 3/2021 | Liaw ....................... | B25D 9/08 |

FOREIGN PATENT DOCUMENTS

KR 2020100007677 7/2010

OTHER PUBLICATIONS

International Search Report from co-pending PCT/US2021/072455, date mailed Feb. 14, 2022.

\* cited by examiner

*Primary Examiner* — Sunil K Singh
*Assistant Examiner* — Eric Daniel Whitmire
(74) *Attorney, Agent, or Firm* — Tuggle Duggins P.A.; Blake P. Hurt

(57) ABSTRACT

A universal adapter to facilitate the easy and efficient of exchange of needle scaler and chisel accessories associated with an air tool receiver/coupler, the adapter including a sleeve with a spring and a spacer, an adapter carrying an O-ring, and an anvil member in contact with the base of a plurality of needles is disclosed herein.

19 Claims, 5 Drawing Sheets

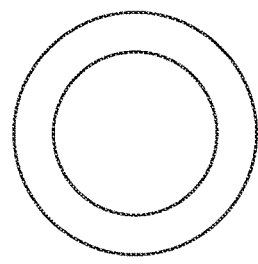
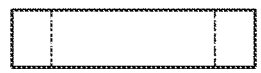
FIG. 5
12

UNIVERSAL QUICK-CHANGE ADAPTER

This non-provisional patent application claims all benefits under 35 U.S.C. § 119(e) of U.S. provisional patent application Ser. No. 63/115,111 filed 18 Nov. 2020, entitled "Universal Quick-Change Adapter", in the United States Patent and Trademark Office, which is incorporated by reference in its entirety herein.

FIELD OF THE INVENTION

The subject matter disclosed herein pertains to hardware fittings generally, and particularly pertains to a coupler configured for engagement with an air tool to facilitate the quick and efficient exchange of needle, chisel, and/or hammer accessories without need of additional tools such as a screwdriver.

DESCRIPTION OF THE PRIOR ART AND OBJECTIVES OF THE INVENTION

Air tools such as pneumatic hammers, jack hammers, nail guns, rivet guns, and the like have been known in the prior art for many years. Pneumatic hammers, also known as air hammers or air chisels, have a wide range of uses including cutting, breaking, carving, and resurfacing various objects and/or surfaces. Pneumatic scalers, also known as needle-gun scalers, needle scalers, or needle guns, are similar in most respects to air hammers, and are similarly used for a wide range of activities, but instead of single, monolithic chisel accessory attached to the front as in the case in an air hammer, a needle scaler (as its name suggested) relies on an accessory including a plurality of elongated metallic "needles" to perform its work. Both the air hammer and the needle scaler are valuable tools across the manufacturing industry, and as noted above, much of their mechanical structure is similar, if not the same. However, given the operating environment of the respective tools, and the manner in which they function, the ability to transition between a chisel accessory and a needle accessory is a time-intensive process that leads to inefficiency and higher costs.

Thus, in view of the problems and disadvantages associated with prior art devices, the subject matter of the present disclosure was conceived and one of its objectives is to provide a universal coupler configured (i.e. sized, shaped, and designed) to facilitate the exchange of a chisel and/or needle scaler accessory without the need of semi-permanent fasteners such as screws.

It is another objective of the subject matter of the present disclosure to provide a universal coupler comprising a sleeve member, an adapter member, a spacer member, and an anvil member.

It is still another objective of the subject matter of the present disclosure to provide a universal coupler with a sleeve member defining a length of approximately three and a half inches (8.89 cm), an outer diameter of an inch and a half (3.81 cm) tapering the last half inch (1.27 cm) at one end to one point three inches (3.30 cm) with an interior bore of seven eighths of an inch (2.22 cm) therein. The opposing end defines a bore of one point thirty-two inches (3.35 cm) with the last sixth of an inch (1.52 cm) on the interior diameter threaded with one and three-eighths by twenty UNEF threads.

It is yet another objective of the subject matter of the present disclosure to provide a universal coupler with an adapter member with a minor collar portion and a major collar portion connected by a stem. The minor collar portion defines an outer diameter of seventy-seven hundredths of an inch (1.96 cm), the major collar portion defines an outer diameter of one and thirty-seven hundredths of an inch (3.48 cm), and the stem defines an outer diameter of fifty-six hundredths of an inch (1.42 cm). Running through the minor collar, the stem, and the major collar is a bore defining a diameter of forty-one hundredths of an inch that flares out the last twenty-four hundredths of an inch (0.61 cm) in the major collar portion to seventy-five hundredths of an inch (1.91 cm). A groove of one and thirty-one hundredths of an inch (3.32 cm) may be formed between the major collar portion and the stem via a shield extending beyond the circumference of the major collar portion and defining a thickness of fifteen hundredths of a inch thick (0.38 cm).

It is a further objective of the subject matter of the present disclosure to provide a universal coupler with an anvil member defining a length of three and eighty hundred twenty-five thousandths of an inch (9.72 cm) and a diameter of three hundred ninety-five thousandths of an inch (1.00 cm) at a first portion but flaring out first to a diameter of seven hundred forty-five thousandths (1.89 cm) at a second portion and then one and twenty-nine hundredths of an inch (3.28 cm) at a third portion.

It is still a further objective of the subject matter of the present disclosure to provide a universal adapter including an annular spacer defining an outer diameter of one and three tenths of an inch (3.30 cm), an inner diameter of seventh-eights of an inch (2.22 cm), and an inner bore of seventeen fortieths of an inch (1.08 cm).

It is yet a further objective of the subject matter of the present disclosure to provide a universal adapter assembly configured to engage with the quick connect coupler of a convention air hammer Various other objectives and advantages of the subject matter of the present disclosure will become apparent to those skilled in the art as a more detailed description is set forth below.

SUMMARY OF THE INVENTION

The aforesaid and other objectives are realized by providing a universal adapter to facilitate the easy and efficient of exchange of needle scaler and chisel accessories associated with an air tool receiver/coupler, the adapter including a sleeve member, an adapter member, a spacer member, and an anvil member interdisposed among a spring, a spacer, and an O-ring.

BRIEF DESCRIPTION OF THE DRAWINGS

FIG. 5 illustrates plan top and side views of a component of the universal quick-change adapter of FIG. 1.

DETAILED DESCRIPTION OF THE PREFERRED EMBODIMENT AND OPERATION OF THE INVENTION

Figure 1:
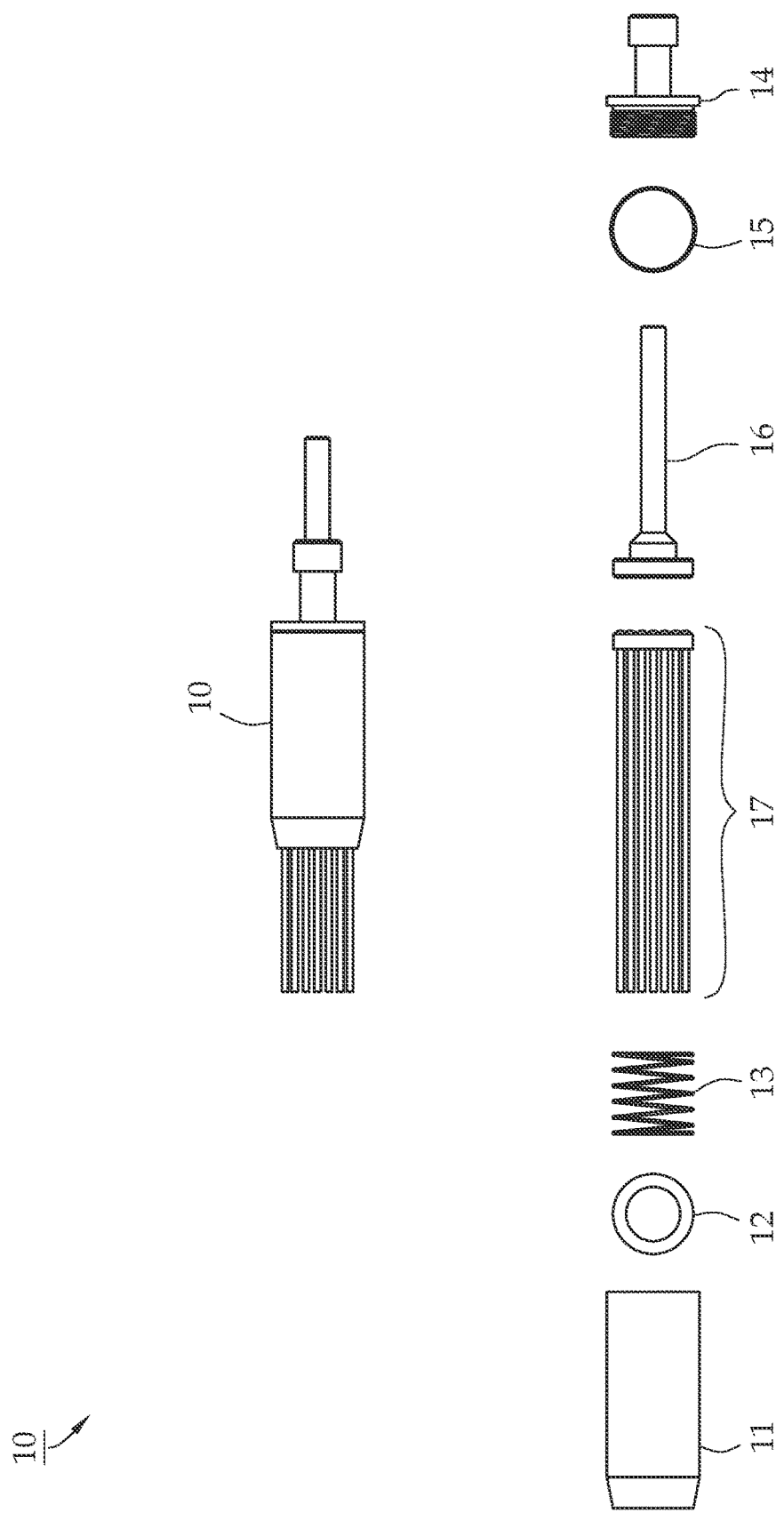
FIG. 1 shows side plan views of the universal quick-change adapter of the subject matter of the present disclosure, in both the exploded and assembled configurations.

Various exemplary embodiments of the present disclosure are described below. Use of the term "exemplary" means illustrative or buy way of example only, and any reference herein to "the invention" is not intended to restrict or limit the invention to exact features or step of any one or more of the exemplary embodiments disclosed in the present specification. References to "exemplary embodiment", "one embodiment", "an embodiment", "various embodiments", and the like may indicate that the embodiment(s) of the invention so described may include a particular feature, structure, or characteristic, but not every embodiment necessarily incudes the particular feature, structure, or characteristic. Further, repeated use of the phrase "in one embodiment", "in an exemplary embodiment", or "in an alternative embodiment" do not necessarily refer to the same embodiment, although they may.

It is also noted that terms like "preferably", "commonly", and "typically" are not utilized herein to limit the scope of the invention or to imply that certain features are critical, essential, or even important to the structure or function of the invention. Rather, these terms are merely intended to highlight alternative or additional features that may or may not be utilized in a particular embodiment of the present invention.

The subject matter of the present disclosure is described more fully hereinafter with reference to the accompanying figures, in which one or more exemplary embodiments of the invention are shown. Like numbers used herein refer to like elements throughout. The invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limited as to the scope of the invention, and any and all equivalents thereof. Moreover, many embodiments such as adaptations, variations, modifications, and equivalent arrangements will be implicitly disclosed by the embodiments described herein and fall within the scope of the instant invention.

Although specific terms are employed herein, they are used in a generic and descriptive sense only and not for the purposes of limitation. Unless otherwise expressly defined herein, such terms are intended to be given their broad, ordinary, and customary meaning not inconsistent with that applicable in the relevant industry ad without restriction to any specific embodiment hereinafter described. As used herein, the article "a" is intended to include one or more items. Where only one item is intended, the terms "one and only one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Figure 2:
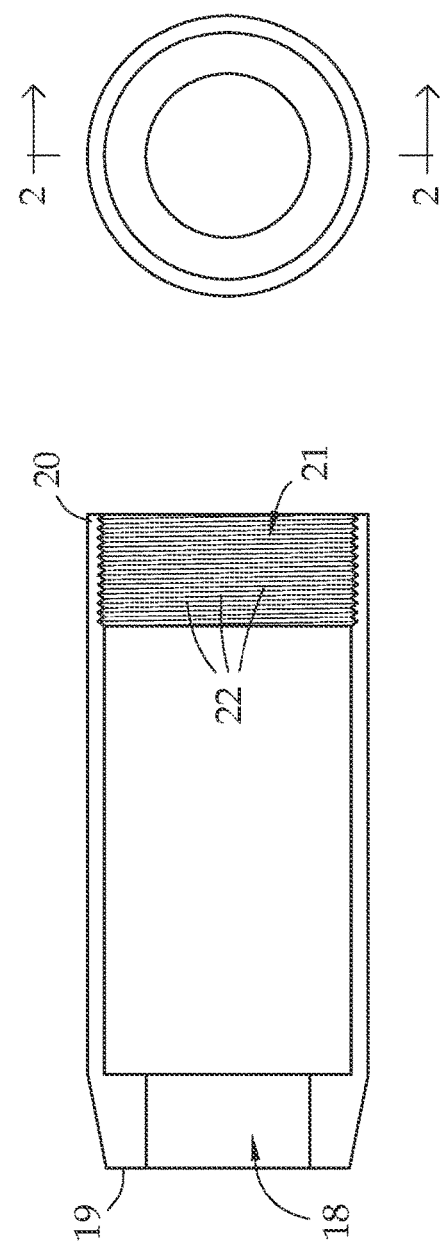
FIG. 2 pictures end plan and cross-sectional views of a component of the universal quick-change adapter of FIG. 1.
Figure 3:
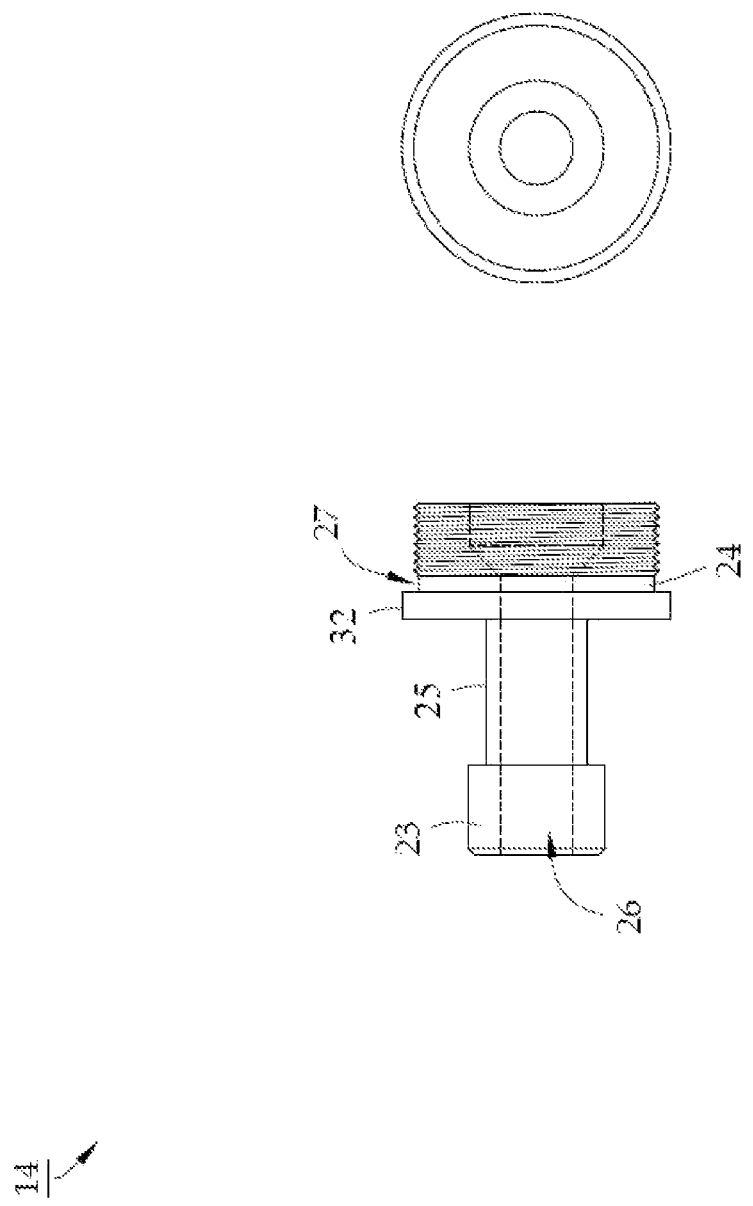
FIG. 3 depicts end plan and cross-sectional views of a component of the universal quick-change adapter of FIG. 1.
Figure 4:
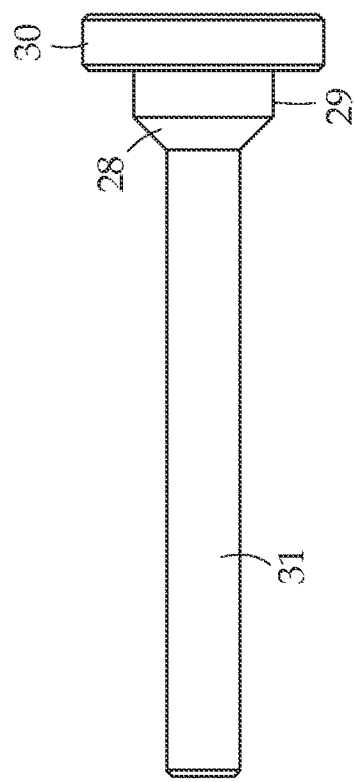
FIG. 4 demonstrates a plan view of a component of the universal quick-change adapter of FIG. 1.

Additionally, any references to advantages, benefits, unexpected results, or operability of the present invention are not intended as an affirmation that the invention has previously been reduced to practice or that any testing has been performed. Likewise, unless stated otherwise, use of verbs in the past tense (present perfect or preterit) is not intended to indicate or imply that the subject matter of the instant disclosure has previously been reduced to practice or that any testing has been performed. The instant disclosure involves a universal, quick-change adapter that permits a user to effectively and efficiently switch between air tool accessories, for example a chisel and a needle scaler, without the need of a semi-permanent fastener such as a screw and associated screwdriver. Other accessories, such as drill bits, shear implements, and the like may also be included within the scope of the instant disclosure. For a better understanding of the subject matter of the instant disclosure and its operation, turning now to the drawings, FIGS. 1-5 display various aspects of the preferred embodiment of universal coupler 10, including sleeve member 11 containing spacer 12 and biasing member 13, adapter member 14 carrying O-ring 15 and anvil member 16 contacting a plurality of needles 17.

The preferred embodiment of sleeve member 11 is generally cylindrical in shape with opposing ends 19, 20 and may define a length of between three and four inches (7.62 cm-10.16 cm), and more preferably approximately three and a half inches (8.89 cm)(+/−1 inch), an outer diameter of between one and two inches (2.54 cm-5.04 cm), and more preferably approximately an inch and a half (3.81 cm)(+/− 0.25 inch) tapering the last half inch (1.27 cm) at one end 19 to approximately (i.e. +/−1.0 cm) one point three inches (3.30 cm) with an interior bore 18 of less than one inch (2.54 cm) and more preferably seven eighths of an inch (2.22 cm) therein. The opposing end 20 defines a bore 21 with a diameter of approximately (i.e. +/−1.0 cm) one point thirty-two inches (3.35 cm) with a portion, and more specifically the last sixth of an inch (1.52 cm) on the interior diameter, threaded; preferably with one and three-eighths by twenty UNEF threads 22. One or more embodiment(s) of sleeve member 11 may further include spacer 12 and biasing member 13. The preferred embodiment of spacer 12 is an annular spacer defining an outer diameter of one and three tenths of an inch (3.30 cm), an inner diameter of seventh-eights of an inch (2.22 cm), and an inner bore of seventeen fortieths of an inch (1.08 cm). The preferred embodiment of biasing member 12 is in the nature of a coil spring.

The preferred embodiment of adapter member 14 is formed with a minor collar portion 23 and a major collar portion 24 connected by a stem 25. The minor collar portion 23 defines an outer diameter of less than one inch (2.54 cm) and more preferably approximately (i.e. +/−1.0 cm) seventy-seven hundredths of an inch (1.96 cm), the major collar portion 24 defines an outer diameter of more than one inch (2.54 cm) and more preferably approximately (i.e. +/−1.0 cm) one and thirty-seven hundredths of an inch (3.48 cm), and the stem 25 defines an outer diameter of less than one inch (2.54 cm) and more preferably fifty-six hundredths of an inch (1.42 cm). The minor collar portion 23 defines a length of less than one inch (2.54 cm) and more preferably half an inch (1.27 cm), the major collar portion 24 defines a length of less than one inch (2.54 cm) and more preferably sixty-five hundredths of an inch (1.65 cm), and the stem 25 defines a length of less than one inch (2.54 cm) and more preferably eight hundred fifteen thousandths of an inch (2.07 cm). Running through the minor collar 23, the stem 25, and the major collar 24 is a bore 26 defining a diameter of less than an inch (2.54 cm) and more preferably forty-one hundredths of an inch that flares out the last twenty-four hundredths of an inch (0.61 cm) in the major collar portion 24 to seventy-five hundredths of an inch (1.91 cm). A groove 27 of one and thirty-one hundredths of an inch (3.32 cm) may be formed between the major collar portion 24 and the stem 25 via a shield 32 extending beyond the circumference of the major collar portion and defining a thickness of fifteen hundredths of a inch thick (0.38 cm). In the preferred embodiment, the groove 27 is configured (i.e. sized and shaped) to receive O-ring 15 therein. Additionally, or in the alternative, adapter member 14 includes complementary threads to mate with sleeve member 11.

The preferred embodiment of anvil member 16 defines of between three and four inches (7.62 cm-10.16 cm) and more preferably a length of approximately (i.e. +/−1.0 cm) three and eighty hundred twenty-five thousandths of an inch (9.72 cm) and a diameter of approximately (i.e. +/−0.5 cm) three hundred ninety-five thousandths of an inch (1.00 cm) at a first portion 28 but flaring out first to a diameter of approximately (i.e. +/−0.5 cm) seven hundred forty-five thousandths of an inch (1.89 cm) at a second portion 29 and then approximately (i.e. +/−0.5 cm) one and twenty-nine hundredths of an inch (3.28 cm) at a third portion 30. In one or more embodiments, the third portion of anvil member 16 contacts a base holding a plurality of needles 17, transmitting the force imparted from the hammer portion of a conventional air tool (not shown) via adapter member 14. Anvil member 16 preferably includes a stem portion 31 that is configured (i.e. sized, shaped, and oriented) to insert in, and ideally pass through the bore defined through adapter member 14, and the bore 26 is configured (i.e. sized, shaped, and oriented) to receive a portion of said anvil member 16 stem 31 therein, and more preferably therethrough. In one embodiment, at least a portion of the anvil member 16 stem 31 portion protrudes out of the bore 26 opposite from where it entered the bore.

In use, spacer 12 and biasing member 13 are positioned within sleeve 11 and then plurality of needles 17 are passed therethrough (in one preferred embodiment, the number of needles number sixteen). Anvil member 16 is positioned in frictional contact with the base of the plurality of needles 17 and adapter member 14 passes along the stem portion 31 of anvil member 16 via the anvil member stem portion 31 passing through the adapter member bore 26, bringing adapter member 14 in close frictional contact with a portion of anvil member 16 via O-ring 15. Another accessory, for example a chisel accessory for a pneumatic air tool, is removed from the quick-connect coupling of a conventional air hammer (not shown) and the minor collar portion is inserted therein, in a quick-connect manner, meaning that no screws and associated screwdriver is/are required to quickly and efficiently exchange the chisel accessory with the plurality of needles 17.

The illustrations and examples provided herein are for explanatory purposes and are not intended to limit the scope of the appended claims.

We claim:

1. A universal adapter comprising an adapter member, an anvil member including a stem portion, and a sleeve; wherein the adapter member further comprises a major collar portion, a minor collar portion, and a stem connecting the major collar portion to the minor collar portion, wherein the major collar portion, the stem, and the minor collar portion combine to define an outer diameter of a continuous, internal adapter member bore extending therethrough, the minor collar portion extending external of the sleeve and configured for quick-connect coupling with a pneumatic air tool, wherein the continuous, internal adapter member bore defines a major collar portion bore diameter, a minor collar portion bore diameter, and a stem bore diameter, the major collar portion bore diameter is greater than one of the minor collar portion bore diameter or the stem bore diameter, and the major collar portion bore diameter is configured to receive a portion of the stem portion of the anvil member therein, wherein the stem portion of the anvil member is configured to be inserted within the adapter member bore via the major collar portion bore diameter, and wherein the anvil member is configured to move between a first position wherein a portion of the stem portion of the anvil member protrudes from the adapter member bore, and a second position wherein no portion of the stem portion of the anvil member protrudes from the adapter member bore.

2. The universal adapter of claim 1 further comprising a groove between the major collar portion and the minor collar portion.

3. The universal adapter of claim 2 further comprising an O-ring, the O-ring positioned within the groove between the major collar portion and the minor collar portion.

4. The universal adapter of claim 1, wherein the minor collar portion defines an outer diameter of less than one inch, and wherein the major collar portion defines an outer diameter of more than one inch.

5. The universal adapter of claim 4, wherein the minor collar portion defines an outer diameter of approximately seventy-seven hundredths of an inch (1.96 cm), and wherein the major collar portion defines an outer diameter of approximately one and thirty-seven hundredths of an inch (3.48 cm).

6. The universal adapter of claim 1, wherein the anvil member is defined by a first portion, a second portion, and a third portion.

7. The universal adapter of claim 6, wherein the anvil member first portion defines a diameter of approximately three hundred ninety-five thousandths of an inch (1.00 cm).

8. The universal adapter of claim 6, wherein the anvil member second portion defines a diameter of approximately seven hundred forty-five thousandths of an inch (1.89 cm).

9. The universal adapter of claim 6, wherein the anvil member third portion defines a diameter of approximately one and twenty-nine hundredths of an inch (3.28 cm).

10. The universal adapter of claim 6, wherein the anvil member defines a diameter at the first portion of approximately three hundred ninety-five thousandths of an inch (1.00 cm), flares out to a diameter of approximately seven hundred forty-five thousandths of an inch (1.89 cm) at the second portion, and flares further to a diameter of approximately one and twenty-nine hundredths of an inch (3.28 cm) at the third portion.

11. The universal adapter of claim 1, wherein the sleeve comprises a first end and a second end, the first end defining a lesser outer diameter than an outer diameter defined by the second end.

12. The universal adapter of claim 11, wherein the first end defines an outer diameter of approximately an inch and a half (3.81 cm) tapering to approximately one point three inches (3.30 cm).

13. The universal adapter of claim 11, wherein the first end and the second end cooperate to define the sleeve, the first end and the second end combining to define an interior bore, the interior bore defining a diameter of approximately (i.e., +/−1.0 cm) one point thirty-two inches (3.35 cm).

14. The universal adapter of claim 13, wherein the first end defines the interior bore with an interior diameter of less than one inch (2.54 cm).

15. The universal adapter of claim 14, wherein a portion of the second end includes a plurality of one and three-eighths by twenty UNEF threads.

16. The universal adapter of claim 13, wherein the first end defines the interior bore with an interior diameter of seven eighths of an inch (2.22 cm).

17. The universal adapter of claim 1, further comprising an annular spacer sized and shaped to be placed within the sleeve.

18. The universal adapter of claim 1, further comprising a biasing member sized and shaped to be placed within the sleeve.

19. The universal adapter of claim 1, further comprising a plurality of needles attached to a base, said plurality of needles configured to be contacted at said base by the anvil.

* * * * *